Sept. 17, 1940.     E. LATSHAW     2,215,182
TRUCK
Filed Oct. 4, 1935
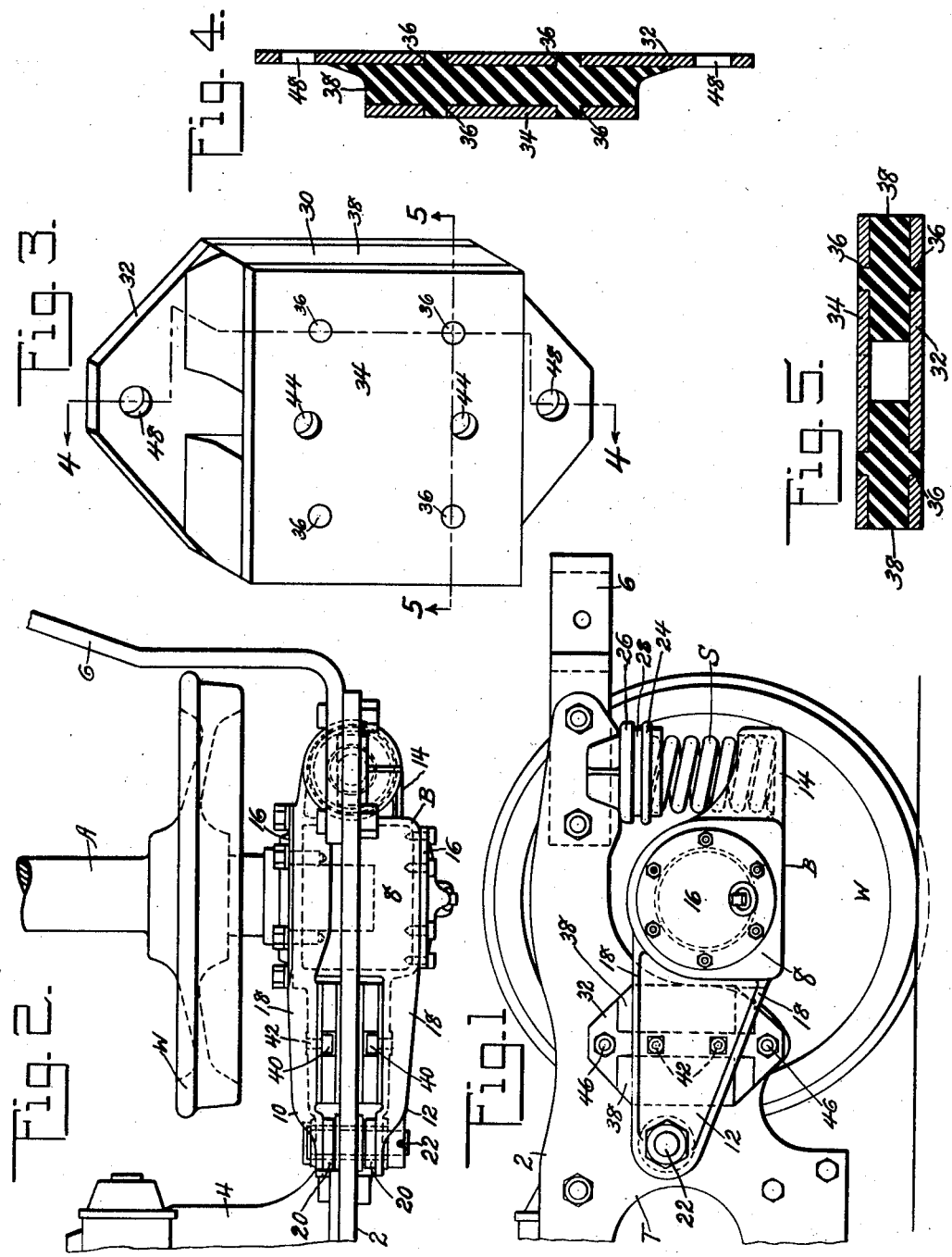
INVENTOR
*Elmer Latshaw*
BY *Donald U. Rich*
ATTORNEY Patented Sept. 17, 1940

2,215,182

UNITED STATES PATENT OFFICE 2,215,182

TRUCK

Elmer Latshaw, Philadelphia, Pa., assignor to The J. G. Brill Company, Philadelphia, Pa., a corporation of Pennsylvania Application October 4, 1935, Serial No. 43,495

14 Claims. (Cl. 105—224.1)

This invention relates to railway trucks in general and in particular to the noiseless type of truck for street railways.

The old type of truck with its pedestal guides, was extremely noisy due to the metallic contact and the fact that the necessary clearances permitted excessive vibration of the parts. It has been previously suggested to eliminate the noise in this old type truck by the liberal use of rubber, but there were so many points needing insulation that the cost made such an arrangement impractical.

It is an object, therefore, of this invention to provide a truck in which the number of possible points of metallic contact are reduced to a minimum.

It is a further object of this invention to provide a truck in which the main points of metallic contact are insulated by means of rubber or other material.

A still further object of the invention is the provision of resilient means acting in shear to assume a portion of the imposed load.

Another object of the invention is the provision of a journal box pivoted to the truck and so insulated as to prevent metallic contacts while permitting slight lateral movement of the journal box.

Another object of the invention is the provision of an insulating and load carrying device in which the resilient material is more positively secured to the metallic plates of the device.

These and other objects of the invention will be apparent to one skilled in the art from a study of the following description and accompanying drawing, in which Figure 1 is an elevational view showing the improved mounting applied to the truck;

Fig. 2 is a plan view of Fig. 1 and shows the relation of the journal box mounting to the truck frame;

Fig. 3 is a perspective view of the insulating unit used on the truck, and

Figs. 4 and 5 are sectional views taken on lines 4—4 and 5—5 of Fig. 3 and show details of the construction.

Referring now to the drawing in detail it is seen that the truck T, a fragment of which is shown, is formed by the pedestalless frame 2 connecting transoms 4 and crosstie 6. The axle A is supported by wheel W and is extended beyond the wheel to provide a bearing portion for the journal box B, although this is purely representative for it is obvious that the journal box could be situated inside the wheel if desired.

The journal box element is formed with the axle surrounding portion 8, inner wing part or arm 10, outer wing part or arm 12 and spring pocket 14, all of which, as clearly shown, are formed integral, although this is merely representative. Inner and outer dust caps 16 are also provided as is customary with this general type of journal box. The inner and outer wing parts or arms 10 and 12 are strengthened by ribs 18 with all parts decreasing in thickness outward from the axle portion to the rear end which is provided with an opening surrounded by an embossment 20 adapted to receive a pin 22 extending through both wing parts and the truck frame, thus pivoting the journal box onto the truck frame.

In order to resiliently support the truck and the imposed load a spring S is placed in the pocket 14 and engages at its upper end a metal plate 24 separated from truck plate 26 by resilient or insulating block 28. The spring is chosen so that it will be sufficiently strong to support the empty car, but is not strong enough to support the loaded car without danger of going solid, hence additional resilient load carrying capacity is necessary. The additional carrying capacity is furnished by insulating units 30 formed by inner metallic plate 32 and outer metallic plate 34, said plates 32 and 34 being provided with holes 36 adapted to receive portions of rubber blocks 38 vulcanized to the respective plates. The holes 36 provide additional securing area for the rubber blocks which are spaced apart in order to receive bolt heads 40 on outer securing bolts 42 inserted through holes 44 of the outer plate. The bolts 42 secure the outer plate to the respective wing part, while bolts 46 inserted in holes 48 secure the inner plate to the truck frame. The rubber blocks are sufficiently thick as to prevent the embossments 20 coming into contact with the truck side frame even under lateral thrusts.

Normally, with the car empty, the insulating units 30 will not be stressed for the reason that the springs S, as before mentioned, are of sufficient strength to alone support the empty car, but upon application of additional load, causing material compression of springs, the rubber 38 or other insulating material will act in shear to absorb its share of the increased load. It will also be noted that upon application of additional load the rubber 38 will be more heavily stressed at the portions adjacent the box than at the portions adjacent the pivot 22 because of the fact these portions are farther removed from the pivot 22 and there will therefore necessarily be greater relative movement between the truck frame 2 and the arms 10 and 12 at the portions adjacent the box than at the portions adjacent the pivot 22. Because of the greater stress placed upon the rubber 38 at the portions adjacent the box, it will be seen that a slight decrease in the thickness of the material at this point will result due to the fact the mass of the rubber 38, when acting in shear, will be spread out or distributed over a greater area at these portions than at the portions adjacent the pivot.

A single and preferred form of the invention has been shown for illustrative purposes only as it is obvious to one skilled in the art that various modifications may be made without departing from the scope of the appended claims.

What is claimed is:

1. In a railway truck having a side frame, a journal box pivoted to said frame, a spring pocket on said journal box, a spring and non-metallic member maintaining said spring pocket and frame in spaced relationship, arms extending from said journal box and overlapping the side frame, resilient means attached to each arm and frame to aid in the support of the load imposed upon the truck, said means also acting to maintain the arms laterally spaced from the side frame.

2. In a railway truck having a side frame, a journal box pivoted to said frame, a spring pocket on said journal box, a compression spring and non-metallic member maintaining said spring pocket and frame in spaced relationship and normally supporting said frame, arms extending from said journal box in spaced overlapping relationship to said side frame, resilient means interposed between each arm and frame and so arranged as to aid in the support of the load imposed upon the truck, said resilient means being so arranged as to become effective in supporting the load only after a predetermined compression of said spring.

3. In a railway truck having a side frame, a journal box pivoted to said frame, a spring pocket on said journal box, a compression spring and non-metallic member maintaining said spring pocket and frame in spaced relationship and normally supporting said frame, arms extending from said journal box in spaced overlapping relationship to said side frame, resilient means interposed between each arm and frame and so arranged as to aid in the support of the load imposed upon the truck, said resilient means being so arranged as to become effective in supporting the load only after a predetermined compression of said spring, yet effective at all times to resist lateral movement of the arms.

4. In a railway truck having a side frame, a journal box pivoted to said frame, means maintaining said frame and journal box in spaced relationship, at least one of said means comprising metallic plates having openings therein and spaced apart insulating means attached to said plates and extending into said openings to provide additional attaching portions, the space between said insulating means permitting attachment of the plate to said journal box.

5. In a railway truck having a side frame, a journal box pivoted to said frame by means laterally spaced from the frame, means for maintaining said frame and journal box in spaced relationship, at least one of said means comprising metallic plates joined by insulating material, said insulating material being so positioned as to have portions thereof unequally stressed under load.

6. In a railway truck having a side frame, a journal box pivoted to said frame by means laterally spaced from the frame, means for maintaining said frame and journal box in vertically spaced relationship, at least one of said means comprising metallic plates joined by insulating material, said material being operative to maintain the journal box in laterally spaced relationship to the frame.

7. In a railway truck having a side frame, a journal box pivoted to said frame by means laterally spaced from the frame, means for maintaining said frame and journal box in spaced relationship, at least one of said means comprising metallic plates joined by insulating material, said material acting in shear to maintain the vertically spaced relationship and in compression to maintain the laterally spaced relationship.

8. In a railway car truck, a side frame, a wheel, an axle, and means for supporting said side frame comprising a lever pivotally connected to the side frame at one end portion thereof and resiliently connected with the frame at its opposite end portion, said lever including a journal box receiving the axle, and elastic means interposed between the lever and side frame and so arranged as to be subject to shearing action upon increase in load applied to the frame.

9. In a railway car truck, a side frame, a wheeled axle, a journal box provided with oppositely extending portions and carried by said axle, one of said portions being connected to the side frame for pivotal movement, means for normally supporting the side frame comprising a spring interposed between the other of said portions and said frame, and elastic means interposed between the said first mentioned portion and the side frame, said elastic means being so arranged as to be subject to shearing action upon increase in load applied to said side frame.

10. In a railway car truck, a side frame, a wheeled axle, a journal box carried by said axle, said journal box having oppositely extending portions one of which is pivotally connected to the side frame, the other of said portions being resiliently connected to said frame and normally supporting the latter, and elastic means interposed between said pivotally connected portion and the side frame and so arranged as to be subject to shearing action upon increase in load applied to said side frame.

11. In a railway car truck having a side frame, a journal box, a compression spring interposed between said journal box and side frame and normally supporting the latter, arms extending from said journal box and pivoted to said side frame, and elastic means interposed between each of said arms and the side frame and so arranged as to have portions thereof subjected to varied shearing action upon increase in load applied to said side frame.

12. In a railway car truck having a side frame, an axle, a journal box receiving said axle, spaced arms extending from the journal box in one direction and respectively lapping opposite surfaces of the side frame, means securing said arms to the side frame in such a manner as to pivotally mount the journal box, and resilient means located fore and aft of the journal box for supporting the frame, certain of said means comprising rubber so arranged with respect to said arms and frame as to act in shear upon increase in load applied to the side frame.

13. In a railway car truck having a side frame, an axle, a journal box receiving the axle and provided with spaced arms respectively lapping opposite surfaces of the side frame and connected thereto in such a manner as to pivotally mount the journal box, spring means interposed between the journal box and side frame for normally supporting the side frame, and resilient means interposed between the said arms and side frame and so formed and arranged as to be subject to shearing action upon increase in load applied to the side frame.

14. In a railway car truck having a side frame, an axle, a journal box receiving the axle and provided with spaced arms respectively lapping opposite surfaces of the side frame and connected to the latter in such a manner as to pivotally mount the journal box, spring means arranged on the opposite side of the journal box from the side arms and interposed between the journal box and side frame to normally support the latter, and spring means interposed between each of said arms and the adjacent side frame surface and so formed as to be subject to shearing action upon increase in load applied to the side frame.

ELMER LATSHAW.